United States Patent
Kabumoto et al.

[11] Patent Number: 5,844,731
[45] Date of Patent: Dec. 1, 1998

[54] LIGHT REFLECTING PLATE

[75] Inventors: Akira Kabumoto; Naoki Yoshida; Masayasu Ito; Mitsunori Okada, all of Yokohama, Japan

[73] Assignee: The Furukawa Electric Co.,Ltd., Tokyo, Japan

[21] Appl. No.: 793,577

[22] PCT Filed: Jun. 18, 1996

[86] PCT No.: PCT/JP96/01667

§ 371 Date: Feb. 18, 1997

§ 102(e) Date: Feb. 18, 1997

[87] PCT Pub. No.: WO97/01117

PCT Pub. Date: Jan. 9, 1997

[30] Foreign Application Priority Data

Jun. 23, 1995 [JP] Japan ................................. 7-158049
Aug. 28, 1995 [JP] Japan ................................. 7-219084

[51] Int. Cl.⁶ .............................. G02B 5/10; G02B 5/08; G02B 7/188; G02B 7/182
[52] U.S. Cl. ........................ 359/869; 359/870; 359/847; 359/848; 359/883; 428/308.4; 428/315.7; 428/480
[58] Field of Search ..................... 359/869, 883, 359/870, 847, 848, 599, 849; 428/480, 34.7, 36.5, 205, 313.5, 308.4, 315.7

[56] References Cited

U.S. PATENT DOCUMENTS

| | | | |
|---|---|---|---|
| 3,637,458 | 1/1972 | Parrish | 161/160 |
| 5,113,476 | 5/1992 | Okada et al. | 385/140 |
| 5,118,372 | 6/1992 | Spahn | 156/160 |
| 5,269,977 | 12/1993 | Nakahashi et al. | |
| 5,645,929 | 7/1997 | Debe | 428/323 |

FOREIGN PATENT DOCUMENTS

| | | |
|---|---|---|
| 61-80225 | 4/1986 | Japan . |
| 3-209293 | 9/1991 | Japan . |
| 4-29291 | 1/1992 | Japan . |
| 4-296819 | 10/1992 | Japan . |
| 6-94923 | 4/1994 | Japan . |

*Primary Examiner*—Ricky D. Shafer
*Assistant Examiner*—Mohammad Y. Sikder
*Attorney, Agent, or Firm*—Frishauf, Holtz, Goodman, Langer & Chick

[57] ABSTRACT

A light reflecting plate includes a thermoplastic polyester foam containing fine cells with a mean cell diameter of 50 $\mu$m or less and having a thickness of 200 $\mu$m or more and a specific gravity of 0.7 or less. This light reflecting plate exhibits a high diffuse reflectance of visible light without adding a pigment or fine particles for improving the light scattering properties.

6 Claims, 2 Drawing Sheets

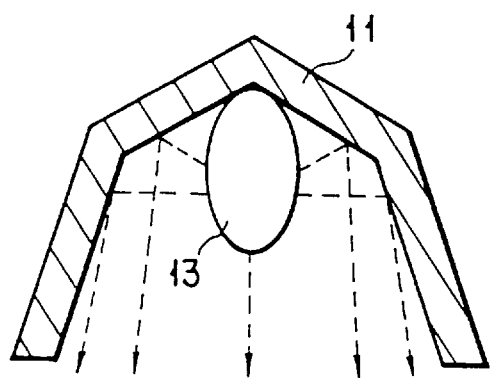
F I G. 2

LIGHT REFLECTING PLATE

TECHNICAL FIELD

The present invention relates to a light reflecting plate applied to a light box of a liquid crystal display or lighting equipment such as a fluorescent lamp or an incandescent lamp.

BACKGROUND ART

In a side light type liquid crystal display, a light box having a structure as shown in FIG. 1 is generally used to obtain a function as a surface light source. As shown in FIG. 1, a light reflecting plate 1, a light guide plate 2, and a translucent diffusion plate 3 are stacked, and a lamp 4 is arranged on the side of these plates. Light from the lamp 4 is guided to the light guide plate 2, with repeating diffuse reflection in the interface between the light guide plate 2 and the light reflecting plate 1, and finally emitted to a display screen through the translucent diffusion plate 3. Examples of the methods used to cause the diffuse reflection in the interface between the light guide plate 2 and the light reflecting plate 1 as described above are: a method of printing a pattern which causes diffuse reflection on the lower surface (the boundary surface with respect to the light reflecting plate 1) of the light guide plate 2; a method of inserting a film on which a predetermined pattern is printed between the light guide plate 2 and the light reflecting plate 1; and a method of giving fine texture to the lower surface of the light guide plate 2.

Also, since the light reflecting plate 1 is required to have a high reflectance, various materials described below are conventionally used. As an example, a light reflecting plate is known which is manufactured by forming a metal mirror surface by depositing a metal deposition film on the surface of a substrate such as a metal. Unfortunately, since diffuse reflection does not easily occur on a light reflecting plate having a metal mirror surface, the quantity of light propagating to the display screen decreases contrary to the expected result. A light reflecting plate made from a film containing a white pigment such as titanium oxide is also used. In a light reflecting plate constructed of this film, the addition amount of the pigment must be increased to suppress the leakage of light to the rear surface. However, the white pigment added to the film absorbs light having a specific wavelength. Accordingly, if the addition amount is increased, an increase in the light loss can no longer be neglected and the reflectance decreases.

Jpn. Pat. Appln. KOKAI Publication No. 4-296819 has disclosed a light reflecting plate made from a polyester film containing fine cells. A light reflecting plate made from a laminated film of this polyester film containing fine cells and another polyester film in which grains of calcium carbonate or silica which does not absorb light are dispersed is also disclosed. This polyester film containing fine cells is manufactured by dispersing an incompatible polymer in polyester and forming voids (cells) around the incompatible polymer grains when the polyester is uniaxially or biaxially oriented. However, it is difficult to uniformly disperse the incompatible polymer in polyester. Therefore, the dispersion of cells in the polyester is also nonuniform and so light cannot be well diffuse-reflected. Additionally, the oriented film is as thin as less than 200 μm, and this increases the leakage of light to the rear surface of the film. As a consequence, a satisfactory reflectance is difficult to achieve by the film disclosed in the above-mentioned publication. To obtain a sufficient reflectance, therefore, it is necessary to arrange another light reflecting plate having a metal mirror surface on the rear surface of the film.

Analogously, the shade of lighting equipment, for example, is sometimes required to have a high reflectance. Examples of light reflecting plates for this use are a light reflecting plate constructed of a metal material such as a steel plate or an aluminum plate and a light reflecting plate manufactured by coating the surface of a plastic injection-molded product with a paint containing a light-reflective pigment. When a light reflecting plate made of a metal material is used, the total reflectance of light is sufficiently high but diffuse reflection is little. Consequently, the reflected light is glaring to the eyes. On the other hand, in a light reflecting plate manufactured by coating the surface of a plastic injection-molded product with a paint containing a light-reflective pigment, the thickness of the coating film is limited. In addition, since the pigment itself absorbs light, the light reflectance lowers.

Jpn. Pat. Appln. KOKAI Publication No. 61-225709 describes a light reflecting plate in which an infrared transmitting film and a film for scattering visible light, which is made from a metal oxide (e.g., titanium oxide) containing fine cells and having a thickness of 0.3 to 0.8 μm, are formed on a transparent substrate such as glass. Unfortunately, since the light scattering film is thin, the reflectance is at most about 85%. Consequently, highly efficient reflection characteristics cannot be obtained.

It is, therefore, an object of the present invention to provide a light reflecting plate which achieves a high diffuse reflectance of visible light only by using a substrate without adding a pigment or fine particles for improving the light scattering properties or without arranging another light reflecting plate having a metal mirror surface on the rear surface.

DISCLOSURE OF INVENTION

A light reflecting plate of the present invention consists of a thermoplastic polyester foam containing fine cells with a mean cell diameter of 50 μm or less and having a thickness of 200 μm or more and a specific gravity of 0.7 or less.

BRIEF DESCRIPTION OF DRAWINGS

FIG. 2 is a sectional view showing an example of a light reflecting plate for a light;

BEST MODE OF CARRYING OUT THE INVENTION

Figure 1:
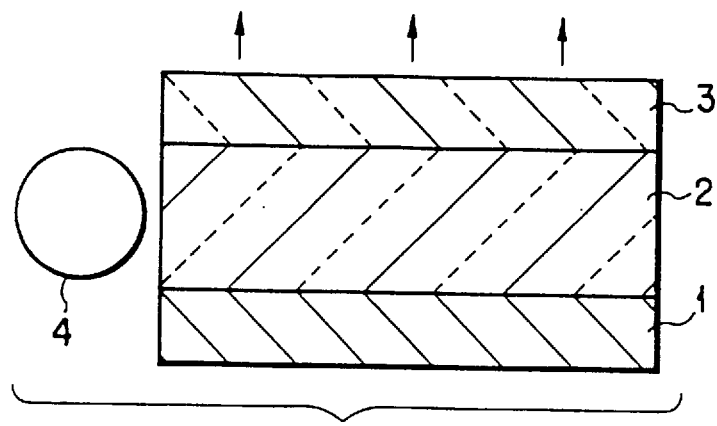
FIG. 1 is a sectional view of a light box in a side light type liquid crystal display device.

The present invention will be described in more detail below.

The mean cell diameter, thickness, and specific gravity of the light reflecting plate of the present invention are defined as described above for the reasons explained below.

If the mean cell diameter exceeds 50 μm, incident light enters the interior of the light reflecting plate or the number of times of irregular reflection on the cell interface decreases. Consequently, the diffuse reflectance tends to decrease. Also, especially when a sheet-like light reflecting plate is used in a light box of a liquid crystal device, the quantity of light returning to the surface of the light reflecting plate decreases due to the light loss from the sides of the light reflecting plate, and this decreases the diffuse reflectance. The mean cell diameter is preferably 30 μm or less. Note that incident light is transmitted if the mean cell diameter is smaller than the wavelength of visible light. Therefore, the mean cell diameter must be equal to or larger than at least the wavelength of visible light.

If the thickness of the light reflecting plate is smaller than 200 μm, the diffuse reflectance decreases, even though other conditions are met, because the leakage of light to the rear surface of the light reflecting plate increases. If the thickness of the light reflecting plate is small, the shape retention degrades when the light reflecting plate is formed into a predetermined shape. The thickness of the light reflecting plate is more preferably 500 μm or more.

If the specific gravity of the light reflecting plate exceeds 0.7, i.e., if the cell content decreases, the light loss increases, even though other conditions are met, due to light absorption in an unformed resin portion or light transmission resulting from the transparency of the light reflecting plate, and this decreases the diffuse reflectance. The specific gravity of the light reflecting plate is preferably 0.05 or more.

The light reflecting plate of the present invention is made from a thermoplastic polyester resin. Specific examples of the thermoplastic polyester resin are polyethyleneterephthalate and polybutyleneterephthalate. Another resin such as polycarbonate may be blended in polyethyleneterephthalate or polybutyleneterephthalate. Polyethyleneterephthalate is most preferable among these resins.

In the present invention, various additives can be blended in the thermoplastic polyester resin before the resin is foamed. Examples of the additives are a crystallization nucleator, a crystallization accelerator, a foaming nucleator, an antioxidant, an antistatic agent, an ultraviolet inhibitor, a light stabilizer, a pigment, a dye, and a lubricant. Of these additives, the addition amount of the crystallization nucleator is preferably 5 wt % or less, and more preferably 2 wt % or less. The foamed light reflecting plate can be coated with these additives, or a resin containing these additives can be laminated on the foamed light reflecting plate.

A method of manufacturing the light reflecting plate of the present invention is not particularly restricted. However, the use of, e.g., the following method is preferable when the mass productivity is taken into consideration. That is, a thermoplastic polyester sheet and a separator are stacked on each other and wound to form a roll. The roll is held in a pressurized inert gas ambient to impregnate the inert gas into the thermoplastic polyester sheet. Finally, the thermoplastic polyester sheet containing the inert gas is foamed by heating the sheet under normal pressure. In this method, an organic solvent can also be impregnated before the roll consisting of the thermoplastic polyester sheet and the separator is held in the pressurized inert gas ambient to impregnate the inert gas into the thermoplastic polyester sheet.

The method of manufacturing the light reflecting plate of the present invention will be described in more detail below.

(1) First, a thermoplastic polyester sheet and a separator are stacked on each other and wound to form a roll. This separator can be any material as long as the material has air gaps through which an inert gas and an organic solvent used where necessary can freely enter and leave and the impregnation of the inert gas to the material itself is negligible. A resin unwoven fabric or a metal mesh is particularly suitable as the separator. As the resin unwoven fabric, a fabric made from a polyolefin-based resin or a nylon-based resin is suitable. Even an unwoven fabric made from a polyester-based resin can also be suitably used as long as the fibers are oriented to prevent an impregnation of an inert gas. The metal mesh is preferably a mesh generally called a wire cloth in which warps and wefts are woven perpendicularly to each other by a weaving method such as plain weave, twill weave, plain folding weave, or twill folding weave. Iron, copper, aluminum, titanium, or an alloy of any of these metals can be used as the material. However, stainless steel is more suitable when the price and the lifetime are taken into consideration. On the other hand, the thermoplastic polyester sheet is preferably not oriented. This is because if the thermoplastic polyester sheet is oriented, the gas is not well impregnated into the sheet and this makes the formation of a desired foamed sheet impossible.

When an organic solvent is impregnated into the sheet, the degree of crystallinity of the thermoplastic polyester sheet can be increased to 30% or more. As a result, the rigidity of the sheet increases to make marks of the separator hardly remain on the surface of the sheet. Additionally, the impregnation time of an inert gas can be shortened. Note that no marks of the separator remain on the sheet surface depending on the type of separator. Therefore, it is not always necessary to perform the process of impregnating an organic solvent. However, it is preferable to perform the process of impregnating an organic solvent in order to shorten the gas impregnation time.

Examples of the organic solvent used to increase the crystallinity of the resin sheet are benzene, toluene, methyl ethyl ketone, ethyl formate, acetone, acetic acid, dioxane, m-cresol, aniline, acrylonitrile, dimethyl phthalate, nitroethane, nitromethane, and benzyl alcohol. Of these organic solvents, acetone is particularly preferable from the points of view of handling and economy.

As a method of impregnating the organic solvent to the roll, it is possible to use a method of immersing the roll the organic solvent or a method of holding the roll in a vapor of the organic solvent. The latter method is superior to the former method in that the use amount of the organic solvent can be small and hardly any additives added to the thermoplastic polyester resin are eluted.

In the method of immersing the roll in the organic solvent, the process time need only be a few hours to ten-odd hours at room temperature. Even if the process is performed over longer time periods, the content of the organic solvent in the resin does not largely increase. When the organic solvent is impregnated while the roll is held in a vapor of the organic solvent, the process time changes in accordance with the type of resin to be foamed or the thickness of the sheet. For example, when acetone is made impregnate into a polyethyleneterephthalate roll placed in a closed vessel saturated with an acetone vapor at room temperature and atmospheric pressure, the process time need only be 24 hours or more if the thickness of the sheet is 0.6 mm and 48 hours or more if the thickness is 0.9 mm. After the process, the content of acetone in the resin is 4 to 5 wt %.

When the organic solvent is made impregnate into the roll in advance to increase the crystallinity of the sheet, it is no longer necessary to increase the crystallinity by adding a large amount of an inert gas. Consequently, the impregnation time of the inert gas can be shortened. For example, when carbon dioxide is impregnated into a polyethyleneterephthalate sheet at 60 kg/cm$^2$, the impregnation time need only be one hour or more if the thickness of the sheet is 0.6 mm and two hours or more if the thickness is 0.9 mm.

When a roll sheet is immersed in the organic solvent, the sheet can be rewound together with a separately prepared separator to form a new roll prior to the subsequent step.

(2) The roll formed as described above is placed in a high-pressure vessel and held in a pressurized inert gas ambient, thereby impregnating the inert gas serving as a foaming agent into the thermoplastic polyester sheet. Examples of the inert gas are helium, nitrogen, carbon dioxide, and argon. Of these gases, carbon dioxide is preferable because a large amount of carbon dioxide can be contained in thermoplastic polyester. The pressure of the inert gas is preferably 30 to 70 kg/cm$^2$, and more preferably 50 kg/cm$^2$ or more. The impregnation time of the inert gas is one hour or more, and the gas is more preferably impregnated until a saturated state is obtained. The gas impregnation time and the gas impregnation amount until the saturated state is obtained vary in accordance with the type of resin to be foamed, the type of inert gas, the impregnation pressure, and the thickness of the sheet. For example, when carbon dioxide is impregnated into a polyethyleneterephthalate sheet at 60 kg/cm$^2$, the impregnation time is preferably 24 hours or more if the thickness of the sheet is 0.6 mm and 96 hours or more if the thickness is 0.9 mm. Under these conditions, the content of carbon dioxide in the resin is 6 to 7 wt %.

(3) The roll is taken out from the high-pressure vessel, and only the thermoplastic polyester sheet containing the inert gas is foamed by heating while the separator is being removed. In this process, the specific gravity of the obtained foam can be controlled by adjusting the time from the takeout from the high-pressure vessel to the foaming. More specifically, the longer this time the higher the specific gravity of the obtained foam. The heating temperature during foaming is set to be higher than the glass transition temperature and lower than the melting point of the resin. Examples of the heating means are a circulating hot air foaming oven, an oil bath, and a molten salt bath. It is preferable to use a circulating hot air foaming oven from the viewpoint of handling. The foaming conditions in the circulating hot air foaming oven are as follows: the foaming temperature is set to about 240° C. and the linear velocity is set so as to make the foaming time be set to 1 to 5 min. Thereafter, the foamed sheet coming out from the oven is wound up on a thermoforming roll whose temperature is controlled to 150° C. or higher. The foamed sheet is then cooled to obtain a desired light reflecting plate consisting of the thermoplastic polyester foam.

The light reflecting plate obtained by the above method shows a diffuse reflectance of 90% or more in a wavelength region of 400 to 1200 nm without adding a pigment or fine particles for improving the light scattering properties or without arranging a substrate having a metal mirror surface on the rear surface.

The shape of the light reflecting plate of the present invention is not particularly restricted. As an example, the sheet-like light reflecting plate obtained by the above method can be used as a light reflecting plate for a side light-type liquid crystal device.

Also, a light reflecting plate for lighting equipment can be obtained by forming the sheet obtained as above into a shape which partially surrounds a light source. As this forming method, it is possible to use a method which uses a vacuum forming machine consisting of a die and a mold and performs vacuum forming under heating conditions by which the temperature of the thermoplastic polyester foam sheet is set to 200° to 220° C.

Figure 3:
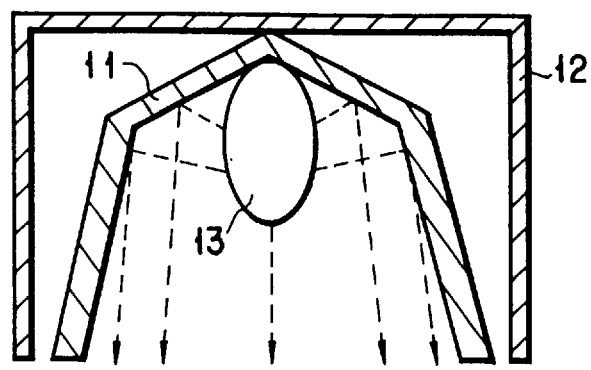
FIG. 3 is a sectional view showing other example of the light reflecting plate for a light.

The form of the light reflecting plate for a light is, for example, as shown in FIGS. 2 or 3. In FIG. 2, a lamp 13 is attached to a central portion of a light reflecting plate 11 having multiple reflective surfaces formed into a concave shape. The lamp 13 is surrounded by the reflective surfaces of the light reflecting plate 11. In this construction the light reflecting plate 11 also functions as a housing. In FIG. 3, a housing 12 is additionally arranged outside the light reflecting plate 11. Note that the reflective surface of the light reflecting plate 11 can also be a smoothly curved surface.

EXAMPLES

Examples of the present invention will be described below.

Examples 1–4

Polyethyleneterephthalate (PET) sheets (C-0312 grade, manufactured by UNITIKA LTD.) having different thicknesses and an olefin-based unwoven fabric (FT300 grade, manufactured by JAPAN VILENE CO., LTD.) were prepared. Each PET sheet and the olefin-based unwoven fabric were stacked on each other and wound to make a roll in such a way that the surfaces of the PET sheet did not contact each other. The roll was held in an acetone vapor at room temperature and atmospheric pressure for 48 hours and taken out. The resultant roll was placed in a high-pressure vessel and carbon dioxide gas at 60 kg/cm$^2$ was made impregnate into the roll. The roll was then taken out from the high-pressure vessel, and, while the olefin-based unwoven fabric separator was being removed, only the PET sheet was continuously supplied so as to make the foaming time be set to one minute to a circulating hot air foaming oven set at 240° C. and foamed. The specific gravity of the foam was controlled by adjusting the time from the takeout of the roll from the high-pressure vessel to the foaming.

Comparative Examples 1–5

Foam sheets different in the thickness, specific gravity, and mean cell diameter were manufactured following the same procedure as in Examples 1 to 4.

The specific gravity, mean cell diameter, and diffuse reflectance of each of the obtained foamed PET sheets were measured. Also, formed products of the foam PET sheets were manufactured and the shape retention of each product was evaluated. These results are summarized in Table 1. The practical measurement and evaluation methods were as follows.

The specific gravity was measured by an underwater displacement method.

The mean cell diameter was obtained by taking an SEM photograph of the section of each sheet, measuring the diameters of cells contained in a predetermined sectional area, and averaging the measured diameters.

The diffuse reflectance was measured in a wavelength region of 400 to 1200 nm by using a recording spectrophotometer (UV-3101PC: manufactured by Shimadzu Corp.) In Table 1, the diffuse reflectance of each light reflecting plate is indicated by a relative value assuming that the diffuse reflectance of a white plate formed by packing fine powder of barium sulfate is 100%.

Figure 4:
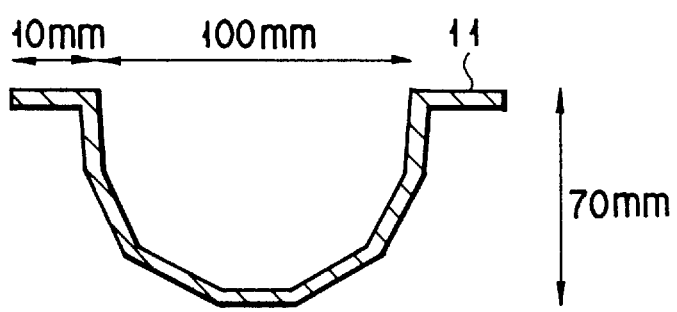
FIG. 4 is a sectional view showing a light reflecting plate for a light manufactured in the Examples of the present invention.

Also, by using each of the foamed PET sheets thus obtained, a semispherical light reflecting plate for a light, having an opening 100 mm in diameter and 70 mm in depth as shown in FIG. 4, was thermoformed by using a vacuum forming machine. Each resultant light reflecting plate was held in hands and applied with a pressure, and whether the plate deformed was observed. In this manner the shape retention was evaluated.

As shown in Table 1, the thickness of Comparative Example 1 was smaller than 200 $\mu$m, each of Comparative Examples 2 to 4 had a thickness of less than 200 $\mu$m and a specific gravity exceeding 0.7, and the mean cell diameter of Comparative Example 5 exceeded 50 μm. Consequently, the diffuse reflectance of each of Comparative Examples 1 to 5 was low in the measurement wavelength region. In contrast, each of Examples 1 to 4 exhibited a diffuse reflectance of 90% or more at a wavelength of any of 400, 600, 800, 1000, and 1200 nm. Additionally, since the thickness of each of the foamed PET sheets of Examples 1 to 4 was 200 μm or more, the formed product of each sheet had a good shape retention. Thus, Examples 1 to 4 can be suitably used as light reflecting plates.

TABLE 1

|  | Thickness of raw fabric sheet (μm) | Thickness (μm) | Specific gravity | Mean cell Diameter (μm) | Diffuse reflectance (%) | | | | | shape retention |
|---|---|---|---|---|---|---|---|---|---|---|
|  |  |  |  |  | 400 nm | 600 nm | 800 nm | 1000 nm | 1200 nm |  |
| Example 1 | 900 | 1700 | 0.10 | 13 | 97.4 | 97.4 | 96.9 | 97.3 | 97.5 | Good |
| Example 2 | 600 | 700 | 0.67 | 8 | 94.8 | 94.9 | 94.4 | 94.2 | 93.3 | Good |
| Example 3 | 300 | 440 | 0.20 | 15 | 97.2 | 97.7 | 97.5 | 97.5 | 97.7 | Fair |
| Example 4 | 300 | 340 | 0.48 | 10 | 92.8 | 94.9 | 94.3 | 94.3 | 94.0 | Fair |
| Comparative example 1 | 140 | 180 | 0.64 | 9 | 87.4 | 90.0 | 89.4 | 89.4 | 88.6 | Poor |
| Comparative example 2 | 140 | 160 | 0.71 | 12 | 86.8 | 88.5 | 87.8 | 87.8 | 87.3 | Poor |
| Comparative Example 3 | 50 | 80 | 0.84 | 11 | 79.9 | 79.2 | 78.0 | 78.0 | 76.3 | Poor |
| Comparative Example 4 | 50 | 60 | 1.12 | 10 | 71.8 | 68.0 | 66.7 | 66.7 | 65.1 | Poor |
| Comparative Example 5 | 600 | 1000 | 0.27 | 76 | 75.8 | 77.8 | 73.2 | 73.2 | 73.9 | Good |

We claim:

1. A light reflecting plate with high diffuse reflectance, consisting essentially of a thermoplastic polyester foam containing fine cells with a mean cell diameter of not more than 50 μm and having a thickness of not less than 200 μm and a specific gravity of not more than 0.7.

2. A light reflecting plate according to claim 1, wherein said thermoplastic polyester foam consists essentially of polyethyleneterephthalate.

3. A light reflecting plate according to claim 1, wherein the mean cell diameter of the fine cells is not more than 30 μm.

4. A light reflecting plate according to claim 1, wherein said thermoplastic polyester foam has a sheet-like shape.

5. A light reflecting plate according to claim 1, wherein said thermoplastic polyester foam is formed into a shape having concave multiple reflective surfaces.

6. A light reflecting plate according to claim 1, wherein said thermoplastic polyester foam is formed into a shape having a curved reflective surface.

* * * * *